United States Patent
Edwards et al.

(10) Patent No.: US 7,058,975 B2
(45) Date of Patent: Jun. 6, 2006

(54) METHOD AND SYSTEM FOR DELAYED WRITE SCANNING FOR DETECTING COMPUTER MALWARES

(75) Inventors: Jonathan Edwards, Portland, OR (US); Shawna Turner, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 945 days.

(21) Appl. No.: 10/014,873

(22) Filed: Dec. 14, 2001

(65) Prior Publication Data

US 2003/0196103 A1   Oct. 16, 2003

(51) Int. Cl.
*H04L 9/00*   (2006.01)
*G06F 11/30*  (2006.01)

(52) U.S. Cl. ................ 726/22; 726/24; 713/188
(58) Field of Classification Search ......... 713/188, 713/200, 201, 202; 726/22
See application file for complete search history.

(56) References Cited

U.S. PATENT DOCUMENTS

| | | | |
|---|---|---|---|
| 5,956,481 A | | 9/1999 | Walsh et al. |
| 6,021,510 A | | 2/2000 | Nachenberg |
| 6,192,477 B1 | * | 2/2001 | Corthell ............... 713/201 |
| 6,615,166 B1 | * | 9/2003 | Guheen et al. ........ 703/27 |
| 2001/0020272 A1 | * | 9/2001 | Le Pennec et al. .... 713/200 |
| 2002/0178383 A1 | * | 11/2002 | Hrabik et al. ......... 713/201 |

FOREIGN PATENT DOCUMENTS

WO   00/22710 A   4/2000

OTHER PUBLICATIONS

Mark Russinovich: "Inside On-Access Virus Scanners" (Sep. 1997).
Hruska J: "Virus Detection" European Conference on Security and Detection, Apr. 1997.

* cited by examiner

*Primary Examiner*—Kambiz Zand
(74) *Attorney, Agent, or Firm*—Christopher J. Hamaty

(57) ABSTRACT

A method, system, and computer program product provides on-access anti-virus scanning of data files, which can be performed without introducing significant performance degradation and provides delayed file write operation scanning upon interception of a file write operation. A method of detecting a malware comprises the steps of monitoring file access operations of a process, intercepting a file access operation of the process to a file, waiting a time interval, and scanning the file for a malware.

42 Claims, 3 Drawing Sheets

METHOD AND SYSTEM FOR DELAYED WRITE SCANNING FOR DETECTING COMPUTER MALWARES

FIELD OF THE INVENTION

The present invention relates to a method, system, and computer program product for detecting computer malwares that delays scanning on a file write operation to increase performance.

BACKGROUND OF THE INVENTION

As the popularity of the Internet has grown, the proliferation of computer malware has become more common. A typical computer malware is a program or piece of code that is loaded onto a computer and/or performs some undesired actions on a computer without the knowledge or consent of the computer operator. The most widespread, well-known and dangerous type of computer malware are computer viruses, that is, programs or pieces of code that replicate themselves onto other connected computers. Once the virus has been loaded onto the computer, it is activated and may proliferate further and/or damage the computer or other computers.

Along with the proliferation of computer viruses and other malware has come a proliferation of software to detect and remove such viruses and other malware. This software is generically known as anti-virus software or programs. In order to detect a virus or other malicious program, an anti-virus program typically scans files stored on disk in a computer system and/or data that is being transferred or downloaded to a computer system, or that is being accessed on a computer system, and compares the data being scanned with profiles that identify various kinds of malware. The anti-virus program may then take corrective action, such as notifying a user or administrator of the computer system of the virus, isolating the file or data, deleting the file or data, etc.

Typically, computer viruses are transmitted in infected executable files or files that contain macros. Executable files include executable code that is intended to be run on a computer system. Thus, anti-virus programs typically scan executable files in order to find viruses. However, there also exist viruses that infect data files, rather than executable files. Anti-virus programs that scan files stored on disk in a computer system and/or data that is being transferred or downloaded to a computer system typically scan both executable files and data files. However, the existence of viruses that infect data files means that anti-virus programs that perform their scans when a file is accessed must also scan data files, as well as executable files and macro-containing files.

For example, the MICROSOFT WINDOWS® INI file format is used by a large number of application programs to store configuration data. One example of such a program is some Internet Relay Chat (IRC) clients that use INI format files to contain scripts that control the behavior of the client. This scripting can be powerful enough that is possible to write viruses or worms using such scripting.

Typically, write access is performed to data files much more frequently than to executable files. Such write access is often inefficiently performed. Because of this, the presence of an anti-virus program with on-access scanning can introduce significant performance degradation as the data file is scanned each time it is changed, in order to check for the possible introduction of a virus or other malware. For example, a file in the INI file format is a text file, in which each piece of information consists of one line of text. A typical and reasonable way for an application to write information to a file having the INI file format is to open the file, write a line of text, and close the file again. This process is repeated for each line that is to be written. When no on-access anti-virus scanner is present, this technique is inefficient, but typically causes little noticeable performance degradation because there is not a lot of processing involved with each individual write. However, when an on-access anti-virus scanner is present, the file is scanned for viruses after each line is written. A single scan would likely not be noticeable, but when many such scans are performed in a short period of time, the cumulative effect is significant and causes significant and noticeable performance degradation of the application program.

A need arises for a technique by which on-access malware scanning of data files can be performed without introducing significant performance degradation.

SUMMARY OF THE INVENTION

The present invention is a method, system, and computer program product for detecting a malware that provides on-access anti-virus scanning of data files, which can be performed without introducing significant performance degradation. The present invention provides delayed file scanning upon interception of a file write operation. In one embodiment of the present invention, a method of detecting a malware comprises the steps of monitoring file access operations of a process, intercepting a file access operation of the process to a file, waiting a time interval, and scanning the file for a malware. The file write operation that was originally intercepted and the file operations to the file being monitored that occur after the initial interception and before the scan occurs are allowed to complete before or during the scan that does occur.

The process may be associated with an application program. The file access operation may be a file write operation. The process may be associated with an application program. The file has a specified file type. The time interval may be predefined. The time interval may be user-defined. The time interval may be based on a filetype of the file. The time interval may be based on the process. The malware may be a computer virus. The malware may be a computer worm. The malware may be a Trojan horse program.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A typical computer malware is a program or piece of code that is loaded onto a computer and/or performs some undesired actions on a computer without the knowledge or consent of the computer operator. Types of malware include computer viruses, Trojan horse programs, and other content. One widespread, well-known and dangerous type of computer malware are computer viruses, that is, programs or pieces of code that replicate themselves and load themselves onto other connected computers. Once the virus has been loaded onto the computer, it is activated and may proliferate further and/or damage the computer or other computers. A particular type of computer virus is the computer worm, which is a program or code that replicates itself over a computer network and may performs malicious actions, such as using up the computer's resources and possibly shutting the system down. A Trojan horse program is typically a destructive program that masquerades as a benign application. Unlike a virus, Trojan horses do not replicate themselves but they can be just as destructive. One insidious type of Trojan horse is a program that claims to rid a computer of malwares but instead introduces malwares onto the computer. Although terms such as virus or anti-virus may be used for clarity, such terms are used only as example of malwares and the present invention contemplates any and all types of malware, including, but not limited to computer viruses, computer worms, Trojan horse programs.

Figure 1:
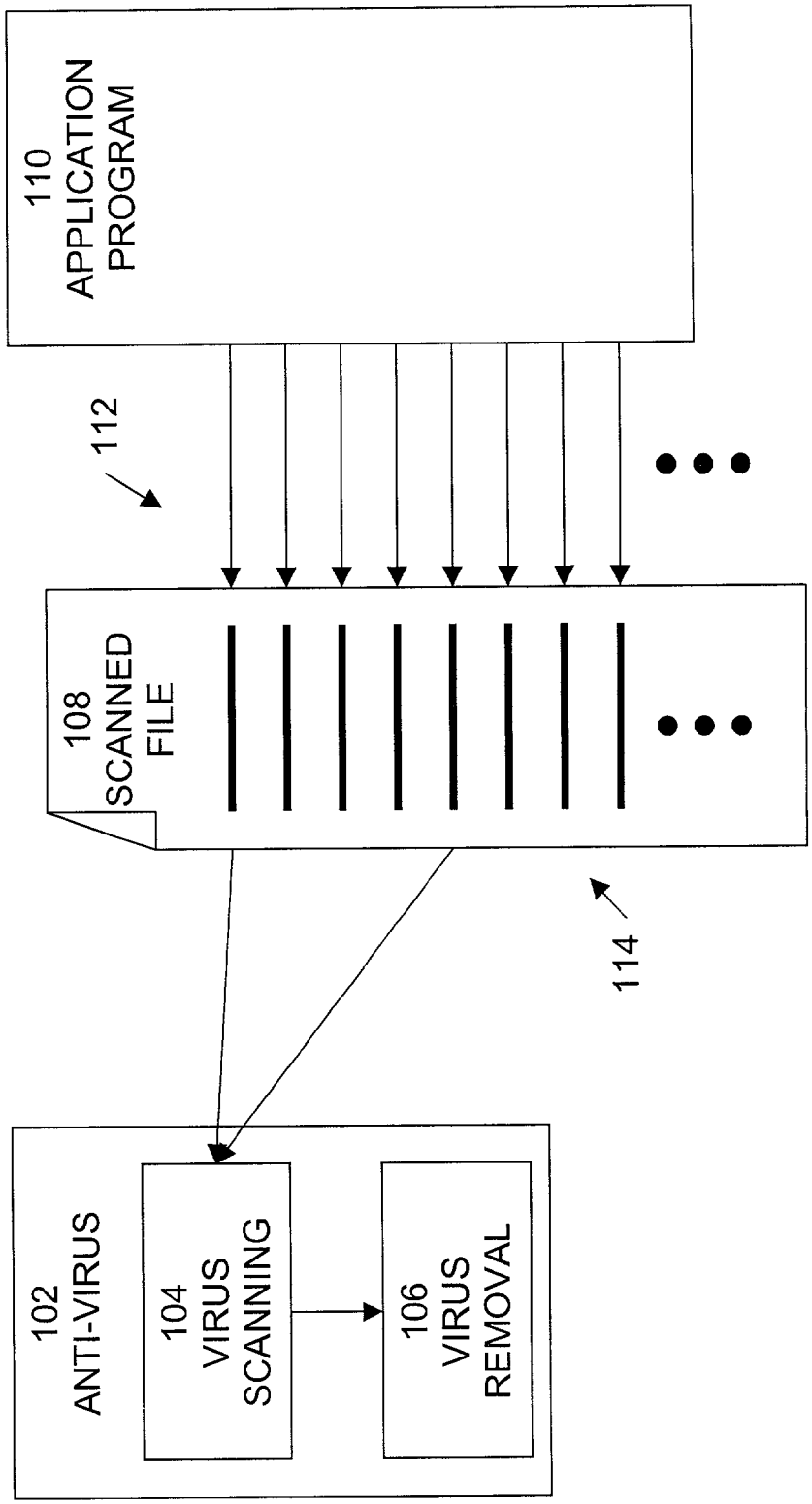
FIG. 1 is an exemplary data flow diagram of information processed by the present invention.

An exemplary data flow diagram of information processed by the present invention is shown in FIG. 1. As shown in FIG. 1, an anti-virus program 102 includes virus scanning routines 104 and virus removal routines 106. Using virus scanning routines 104, anti-virus program 102 scans files, such as scanned file 108, looking for malware, such as viruses and worms, that may be included in the file. The scanned files may include any types of files, including data files, such as MICROSOFT WINDOWS® INI files, other text files, graphics files, audio files, video files, or files containing other data. When a virus or other malware is found, anti-virus program 102 may use virus removal routines 106 to remove instances of the virus from the infected file.

Scanned file 108 is a file that is accessed by application program 110. Application program 110 may perform access operations on scanned file 108, such as file read operations and file write operations. Although scanned file 108 may be any type of file, including an executable file, application programs, such as application program 110, most often write to data files. In particular, application program 110 may perform a plurality of file writes, such as the set of file writes 112 to scanned file 108. Each file write adds or modifies data 114 included in scanned file 108. Each file write may write to a sequential location in scanned file 108 or to a random location in scanned file 108.

Ideally, anti-virus program 102 should only scan scanned file 108 when the plurality of writes 112 have been completed. However, virus scanning routines 104 do not have sufficient information to determine when a set of file writes, such as file writes 112, has just begun or just ended. The OAS sees a discrete set of open and close operations and cannot guess which is the last one.

The present invention solves this problem by intercepting the first, or one of the first, write operations and allowing it to continue. Scanned file 108 is then scanned after a time interval has elapsed. In the meantime, other open, close, and write operations requests to the same file are allowed to proceed without being scanned. The file write operation that was originally intercepted and the file operations to the file being monitored that occur after the initial interception and before the scan occurs are allowed to complete before or during the scan that does occur.

If the set of file writes, such as file writes 112, performed by application program 110, lasts less than the time interval, then the effect is that the last write will be scanned, since the first scan occurs after the final write has occurred. If the set of file writes, such as file writes 112, performed by application program 110, lasts longer than the time interval, then the process will repeat and the next operation that is intercepted will be scanned after a delay. The effect is that a sample of the set of writes is scanned instead of all the writes being scanned. In addition, it is ensured that the final file, after all writes have been completed, is scanned.

The main variable in this process is the time interval between the file write operation being detected and scanned file 108 being scanned. The time interval should be short enough that viruses and other malware are detected in a timely manner. However, the time interval should also be significantly longer than the open/write/close cycle that is required by application program 110 for each write, so that the fraction of operations that are scanned is small enough to provide adequate performance.

Each write is done as part of a discrete Open-File/Write/Close-File sequence. On-access scanners intercept the individual opens and closes and may or may not ignore the writes. If application did Open-File/Write/Write/ . . . /Write/Write/Close-File then there would be no problem, indeed many programs already behave nicely like this.

For example, in the case of MICROSOFT WINDOWS® INI files, the open/write/close cycle is typically very quick—several thousand may be performed per second on an average desktop personal computer system. Therefore, a delay of, for example, one second allows many such cycles to be completed without the overhead of scanning, yet keeps virus detection delay to a short time.

The time interval used may be predefined, definable by the user or administrator of the anti-virus program, or the time interval may be varied based on the filetype of scanned file 108 or based on the particular application program 110 that is performing the operations.

Figure 2:
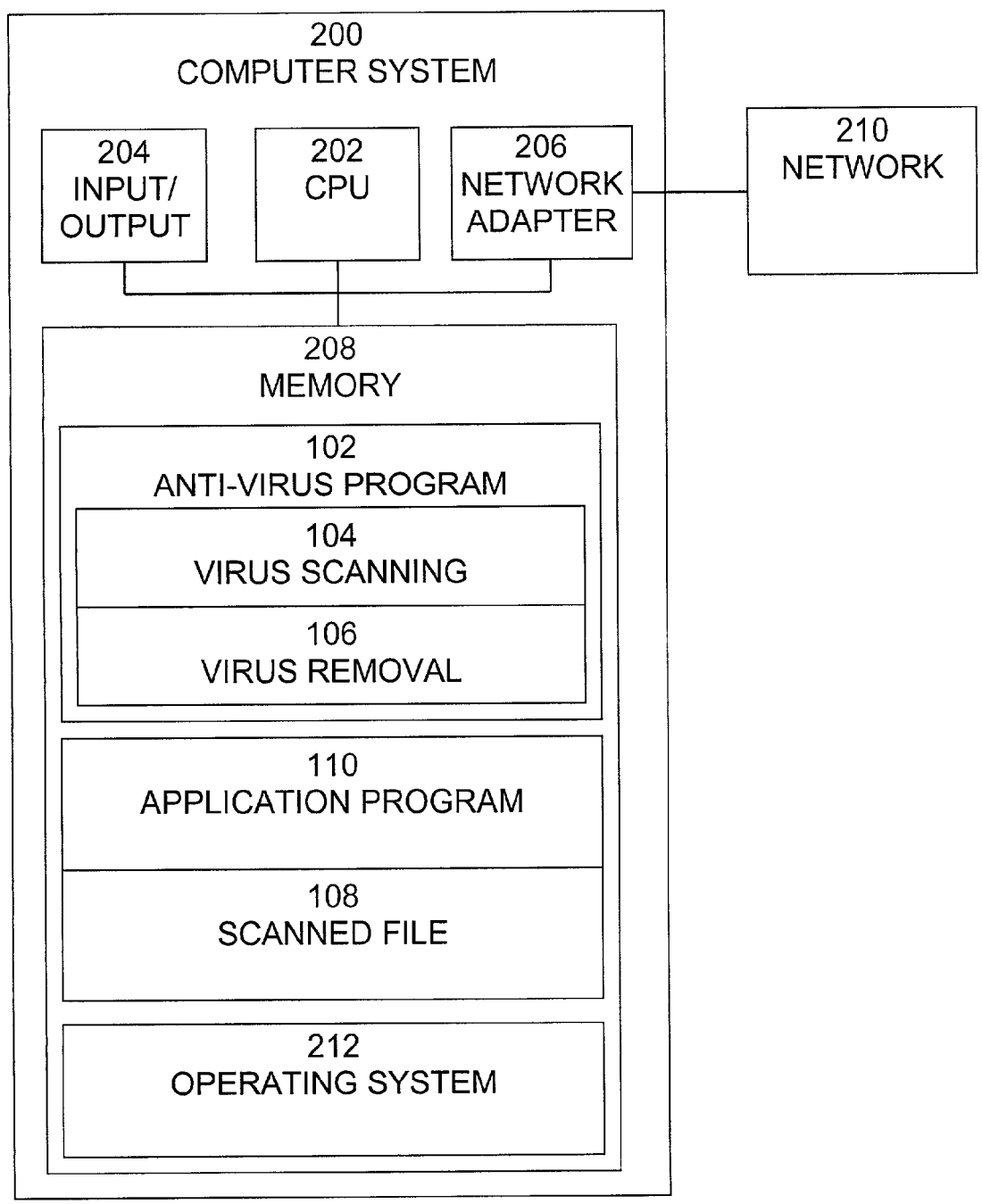
FIG. 2 is a block diagram of an exemplary computer system, in which the present invention may be implemented.

A block diagram of an exemplary computer system 200, in which the present invention may be implemented, is shown in FIG. 2. Computer system 200 is typically a programmed general-purpose computer system, such as a personal computer, workstation, server system, and minicomputer or mainframe computer. Computer system 200 includes processor (CPU) 202, input/output circuitry 204, network adapter 206, and memory 208. CPU 202 executes program instructions in order to carry out the functions of the present invention. Typically, CPU 202 is a microprocessor, such as an INTEL PENTIUM® processor, but may also be a minicomputer or mainframe computer processor. Although in the example shown in FIG. 2, computer system 200 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 200 is implemented on a plurality of networked computer systems, which may be single-processor computer systems, multi-processor computer systems, or a mix thereof.

Input/output circuitry 204 provides the capability to input data to, or output data from, computer system 200. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces computer system 200 with network 210. Network 210 may be any standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of the present invention. Memory 208 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 208 includes anti-virus program 102, application program 112, scanned file 108, and operating system 212. Anti-virus program 102 includes virus scanning routines 104 and virus removal routines 106. Scanned file 108 is a file that is accessed by application program 110. Application program 110 may perform access operations on scanned file 108, such as file read operations and file write operations. Although scanned file 108 may be any type of file, including an executable file, application programs, such as application program 110, most often write to data files. As application program 110 performs accesses on scanned file 108, anti-virus program 102 scans scanned file 108 using virus scanning routines 104 until a virus or other malware is found. Anti-virus program 102 may then use virus removal routines 106 to remove instances of the virus from scanned file 108. Operating system 212 provides overall system functionality.

Figure 3:
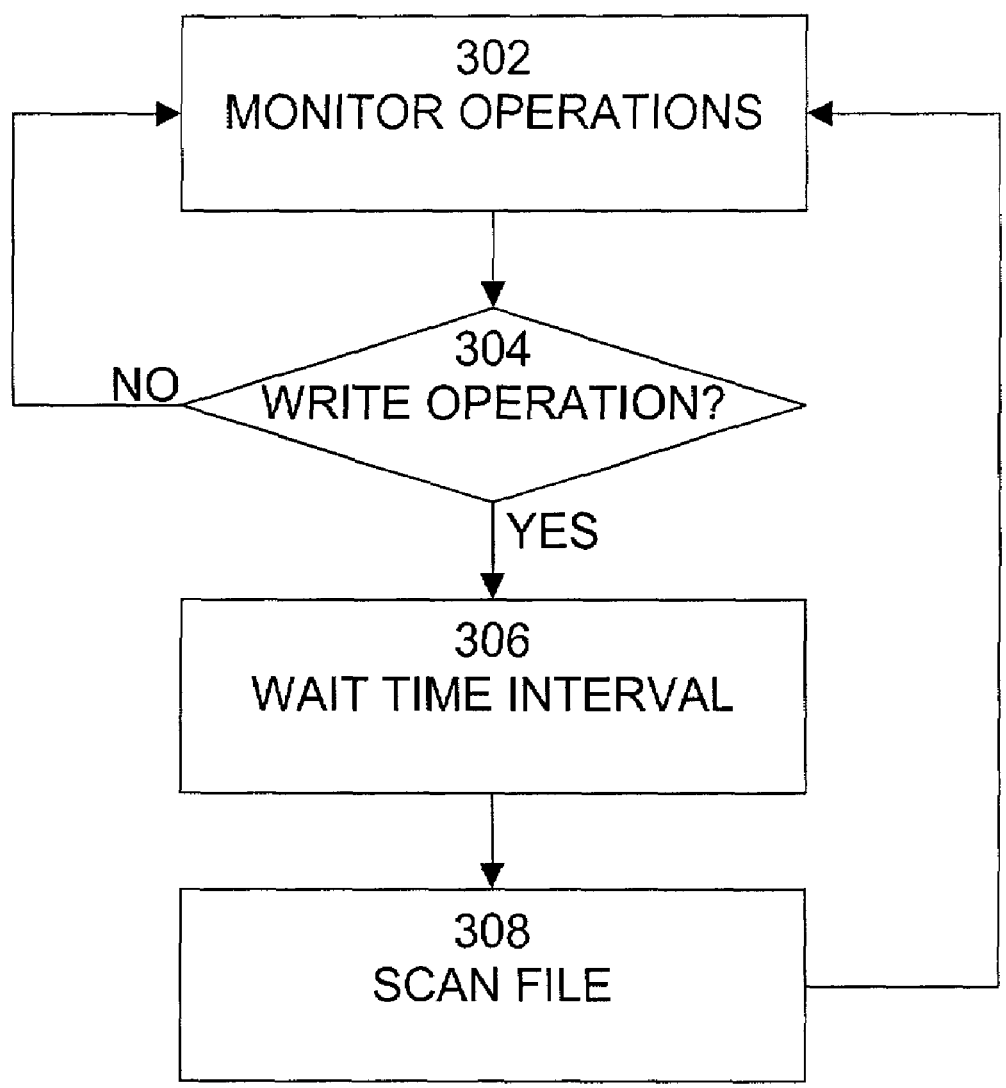
FIG. 3 is an exemplary flow diagram of a file scanning process, which may be implemented in the system shown in FIG. 2.

An exemplary flow diagram of a file scanning process 300, which may be implemented in the system shown in FIG. 2, is shown in FIG. 3. FIG. 3 is best viewed in conjunction with FIG. 1. Process 300 begins with step 302, in which system operations performed by application programs and other processes are monitored by anti-virus program 102. Anti-virus program 102 is configured to monitor a variety of system operations, including file access operations, such as file writes. When such an operation occurs, anti-virus program 102 intercepts the operation and examines it to determine what action to take. When a file write operation is performed by application program 110 on scanned file 108, such as the first write operation among write operations 112, the file write operation is intercepted by anti-virus program 102. In step 304, if the intercepted operation is a file write to a file of the appropriate file type, then the action taken by anti-virus program 102 is to allow process 300 to proceed to step 306. If the intercepted operation is not a file write to a file of the appropriate file type, then anti-virus program 102 may take other actions.

In step 306, process 300 waits for a time interval, then, in step 308, virus scanning routines 104 of anti-virus program 102 are used to scan scanned file 108 for viruses and other malware. During the time interval, other open, close, and write operations to scanned file 108 are allowed to proceed without being scanned. The process then loops back to step 302, in which system operations are monitored.

If the set of file writes, such as file writes 112, performed by application program 110, lasts less than the time interval, then the effect is that scanned file 108 will be scanned after the last write has occurred, since the first scan occurs after the final write has occurred. If the set of file writes, such as file writes 112, performed by application program 110, lasts longer than the time interval, then another file write will be intercepted and scanned file 108 will be scanned again after a delay. The effect is that a sample of the set of writes is scanned instead of all the writes being scanned. In addition, it is ensured that the final file, after all writes have been completed, is scanned.

The main variable in this process is the time interval between the file write operation being detected and scanned file 108 being scanned. The time interval should be short enough that viruses and other malware are detected in a timely manner. However, the time interval should also be significantly longer than the open/write/close cycle that is required by application program 110 for each write, so that the fraction of operations that are scanned is small enough to provide adequate performance.

For example, in the case of MICROSOFT WINDOWS® INI files, the open/write/close cycle is typically very quick—several thousand may be performed per second on an average desktop personal computer system. Therefore, a delay of, for example, one second allows many such cycles to be completed without the overhead of scanning, yet keeps virus detection delay to a short time.

The time interval used may be predefined, definable by the user or administrator of the anti-virus program, or the time interval may be varied based on the filetype of scanned file 108 or based on the particular application program 110 that is performing the operations.

Typically, anti-virus program 102 is configured to perform process 300 only in response to intercepting a file write operation to a file of one or more specified file types. The file types are specified based on the likelihood that the file type may contain a virus or other malware that may be detected by process 300. For example, the MICROSOFT WINDOWS® INI file type is one such file type that may contain a virus or other malware that may be detected by process 300. The specification of file types is typically done by the vendor of anti-virus program 102, the administrator of computer systems on which anti-virus program 102 is installed, or the user of a computer system on which anti-virus program 102 is installed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of detecting a malware comprising the steps of:
   monitoring file access operations of a process;
   intercepting a file access operation of the process to a file;
   in response to the intercepting, waiting a time interval between the intercepting and scanning the file for a malware; and
   scanning the file for the malware, after waiting the time interval;
   wherein the process is associated with an application program and wherein the file access operation is a file write operation.

2. The method of claim 1, wherein the file has a specified file type.

3. The method of claim 1, wherein the time interval is predefined.

4. The method of claim 1, wherein the time interval is user-defined.

5. The method of claim 1, wherein the time interval is based on a file type of the file.

6. The method of claim 1, wherein the time interval is based on the process.

7. The method of claim 1, wherein the malware is a computer virus.

8. The method of claim 1, wherein the malware is a computer worm.

9. The method of claim 1, wherein the malware is a Trojan horse program.

10. The method of claim 1, further comprising the step of:
    allowing the intercepted file access operation of the process to a file to complete.

11. The method of claim 10, further comprising the step of:
    allowing at least one additional file access operation of the process to a file that occurs before the scanning of the file for a malware to complete.

12. The method of claim 1, wherein at least a portion of the file access operations are completed before the scanning.

13. The method of claim 1, wherein at least a portion of the file access operations are completed during the scanning.

14. The method of claim 1, wherein the file access operations that occur on the file after the intercepting of a file write operation are completed before the scanning.

15. The method of claim 1, wherein the file access operations that occur on the file after the intercepting of a file write operation are completed during the scanning.

16. The method of claim 1, wherein, if a set of the file access operations lasts less than the time interval, only a last file access operation of the set is scanned.

17. The method of claim 1, wherein only a sample of a set of the file access operations is scanned.

18. The method of claim 1, wherein a final version of the file is scanned, after all of the file access operations of a set are complete.

19. The method of claim 1, wherein the time interval is longer than at least one of an open cycle, a write cycle, and a close cycle associated with the file access operations.

20. The method of claim 1, wherein the time interval is initiated after interception of a first file access operation such that, during the time interval, multiple subsequent file access operations are completed without the scanning, after which the file is scanned.

21. A system for detecting a malware comprising:
    a processor operable to execute computer program instructions;
    a memory operable to store computer program instructions executable by the processor; and
    computer program instructions stored in the memory and executable to perform the steps of:
    monitoring file access operations of a process;
    intercepting a file access operation of the process to a file;
    in response to the intercepting, waiting a time interval between the intercepting and scanning the file for a malware; and
    scanning the file for the malware, after waiting the time interval;
    wherein the process is associated with an application program and wherein the file access operation is a file write operation.

22. The system of claim 21, wherein the file has a specified file type.

23. The system of claim 21, wherein the time interval is predefined.

24. The system of claim 21, wherein the time interval is user-defined.

25. The system of claim 21, wherein the time interval is based on a file type of the file.

26. The system of claim 21, wherein the time interval is based on the process.

27. The system of claim 21, wherein the malware is a computer virus.

28. The system of claim 21, wherein the malware is a computer worm.

29. The system of claim 21, wherein the malware is a Trojan horse program.

30. The system of claim 21, further comprising the step of:
    allowing the intercepted file access operation of the process to a file to complete.

31. The method of claim 30, further comprising the step of:
    allowing at least one additional file access operation of the process to a file that occurs before the scanning of the file for a malware to complete.

32. A computer program product for detecting a malware comprising:
    a computer readable medium;
    computer program instructions, recorded on the computer readable medium, executable by a processor, for performing the steps of
    monitoring file access operations of a process;
    intercepting a file access operation of the process to a file;
    in response to the intercepting, waiting a time interval between the intercepting and scanning the file for a malware; and
    scanning the file for the a malware, after waiting the time interval;
    wherein the process is associated with an application program and wherein the file access operation is a file write operation.

33. The computer program product of claim 32, wherein the file has a specified file type.

34. The computer program product of claim 32, wherein the time interval is predefined.

35. The computer program product of claim 32, wherein the time interval is user-defined.

36. The computer program product of claim 32, wherein the time interval is based on a file type of the file.

37. The computer program product of claim 32, wherein the time interval is based on the process.

38. The computer program product of claim 32, wherein the malware is a computer virus.

39. The computer program product of claim 32, wherein the malware is a computer worm.

40. The computer program product of claim 32, wherein the malware is a Trojan horse program.

41. The computer program product of claim 32, further comprising the step of:

allowing the intercepted file access operation of the process to a file to complete.

42. The computer program product of claim 41, further comprising the step of:

allowing at least one additional file access operation of the process to a file that occurs before the scanning of the file for a malware to complete.

* * * * *